United States Patent [19]

Oat-Judge

[11] Patent Number: 5,046,748
[45] Date of Patent: Sep. 10, 1991

[54] WALKER WITH AUTOMATIC BRAKING MECHANISM

[76] Inventor: Patricia C. Oat-Judge, 7 Rosewood Dr., Farmington, Conn. 06032

[21] Appl. No.: 505,839

[22] Filed: Apr. 6, 1990

[51] Int. Cl.⁵ .............................................. B62B 5/04
[52] U.S. Cl. .................................. 280/47.34; 280/43; 280/33.994; 272/70.3; 188/5
[58] Field of Search ................ 280/43, 33.994, 33.992, 280/33.991, 47.34; 188/5, 6, 7; 272/70, 70.3

[56] References Cited

U.S. PATENT DOCUMENTS

| | | | |
|---|---|---|---|
| 2,583,644 | 1/1952 | Grimes | 280/36 |
| 2,590,048 | 3/1952 | Sides | 280/50 |
| 2,872,967 | 2/1959 | Kirkpatrick | 155/22 |
| 3,118,553 | 1/1964 | Rosenweig | 214/501 |
| 3,500,965 | 3/1970 | Nossokoff et al. | 280/33.994 |
| 3,774,929 | 11/1973 | Stanley | 280/41 |
| 4,059,285 | 11/1977 | McCoy | 280/651 |
| 4,302,025 | 11/1981 | Waddell et al. | 188/5 |
| 4,840,388 | 6/1989 | Doughty | 280/33.994 |

Primary Examiner—Andres Kashnikow
Assistant Examiner—Richard Camby
Attorney, Agent, or Firm—CTC & Associates

[57] ABSTRACT

A walker has a basket, a handle for use in pushing the walker along an upwardly facing surface and a plurality of legs connected to the basket and to the handle. The legs have lower ends, and a wheel and a braking element are associated with the lower end of each leg. A braking mechanism is provided for automatically actuating the braking elements and causing same to engage the upwardly facing surface if a predetermined weight is applied to the handle or to the basket, thus to stop the walker. The walker also has a manually operable brake system whereby the user can deliberately bring the walker to a stop.

4 Claims, 3 Drawing Sheets

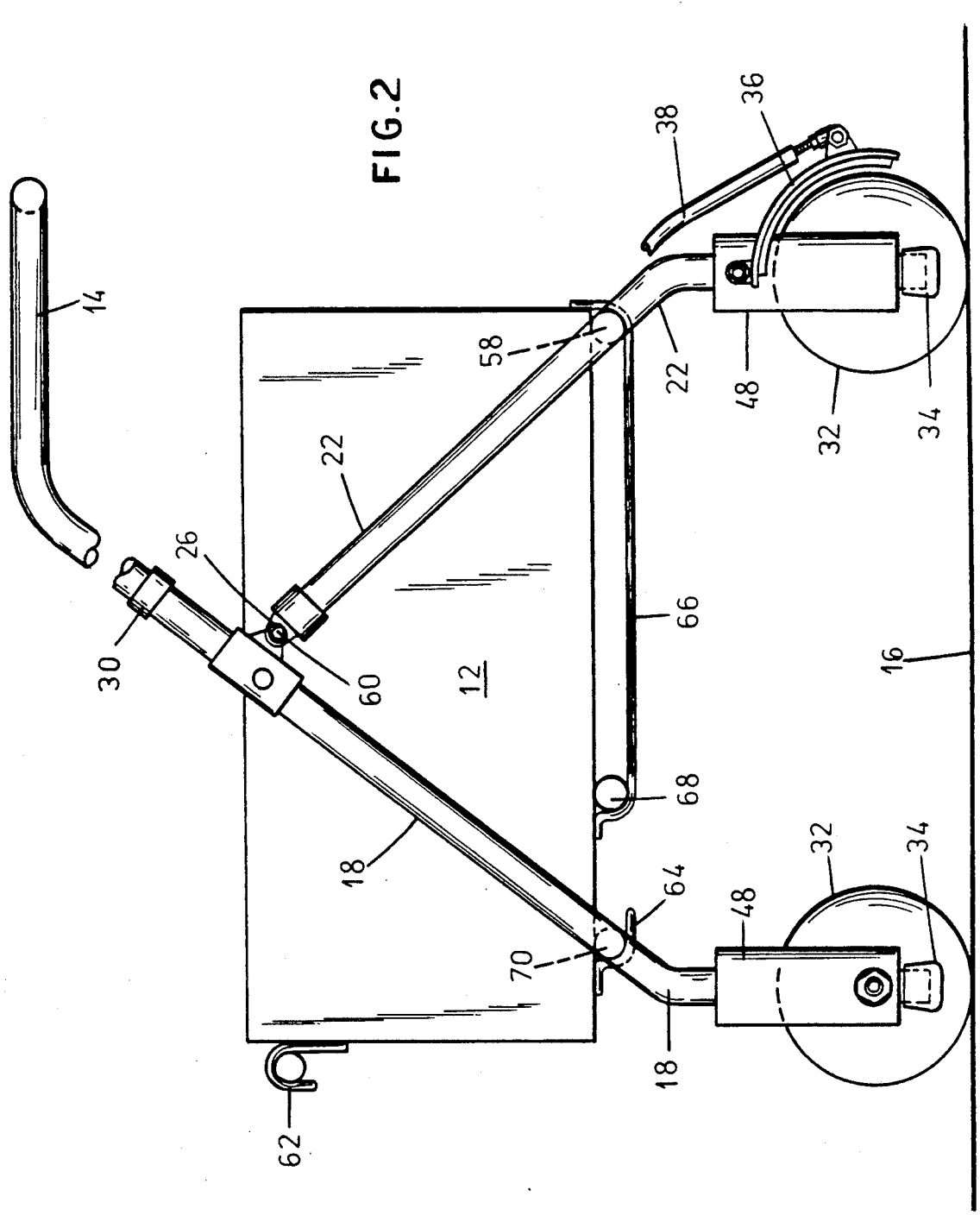

WALKER WITH AUTOMATIC BRAKING MECHANISM

BACKGROUND OF THE INVENTION

The present invention relates to walkers and more particularly to a walker with automatic braking mechanism. Still more particularly, the walker is light in weight with six inch wheels with the safety feature that the wheels automatically retract to actuate a braking element of a braking mechanism when a set weight is applied on the handle. A metal frame supports a basket capable of holding two standard grocery bags. The walker also has manually operated self-locking hand brakes and is of adjustable height and is intended for elderly and handicapped people who need a shopping cart that can be pushed, not pulled. The walker is also intended for use by those of unsteady gait who wish to walk outside and need a walker with large stable wheels and a container for personal belongings. The center of gravity is low and forward to counter loss of balance and prevent backward falls. The walker folds to a size that is easily stored in a closet or car trunk. The walker in appearance resembles a cart more than a traditional walker and will appeal to those who might be embarrassed to be seen with a traditional walker.

A patentability search hereon revealed the following U.S. patents:

| U.S. Pat. No. | Date | Inventor |
| --- | --- | --- |
| 2,583,644 | January 29, 1952 | Grimes |
| 2,590,048 | March 18, 1952 | Sides |
| 2,872,967 | February 10, 1959 | Kirkpatrick |
| 3,118,553 | January 21, 1964 | Rosenzweig |
| 3,774,929 | November 27, 1973 | Stanley |
| 4,059,285 | November 22, 1977 | McCoy |

These prior patents do not appear to disclose, suggest or make obvious the idea of a walker with wheels that automatically retract when subjected to a predetermined weight applied to the handle of the walker, or otherwise, thus to stop the walker from rolling.

It is therefore an important object of the invention to provide a walker that will automatically brake to a stop if a predetermined weight is applied to the walker, most notably if the user of the walker falls onto the walker.

It is another important object of the invention to provide a walker also having manually operable brakes.

The foregoing and other objects and advantages of the invention will appear from the following description of a preferred embodiment of the invention.

SUMMARY OF THE INVENTION

The inventive walker comprises a basket for carrying items as desired, a handle for use in pushing the walker along an upwardly facing surface, a plurality of legs connected to and carrying the basket and having lower ends. There are four such legs and each has a wheel on its lower end and there mounted by a special arrangement, a braking mechanism whereby if a predetermined weight is applied to the handle or the basket, as might happen if the user of the walker should fall while pushing the walker along a generally horizontal surface, the braking mechanism will automatically be actuated to bring the walker to a stop. More particularly, the lower ends of the legs are provided with braking elements and the special arrangement provides means for automatically actuating the braking elements if a predetermined weight is applied to the handle or the basket, thus to stop the walker.

The walker further has manually operable brakes, whereby the user can deliberately bring the walker to a stop.

DESCRIPTION OF THE DRAWING

FIG. 2 is a partly schematic side view of the walker of FIG. 1.

DESCRIPTION OF THE INVENTION

Figure 1:
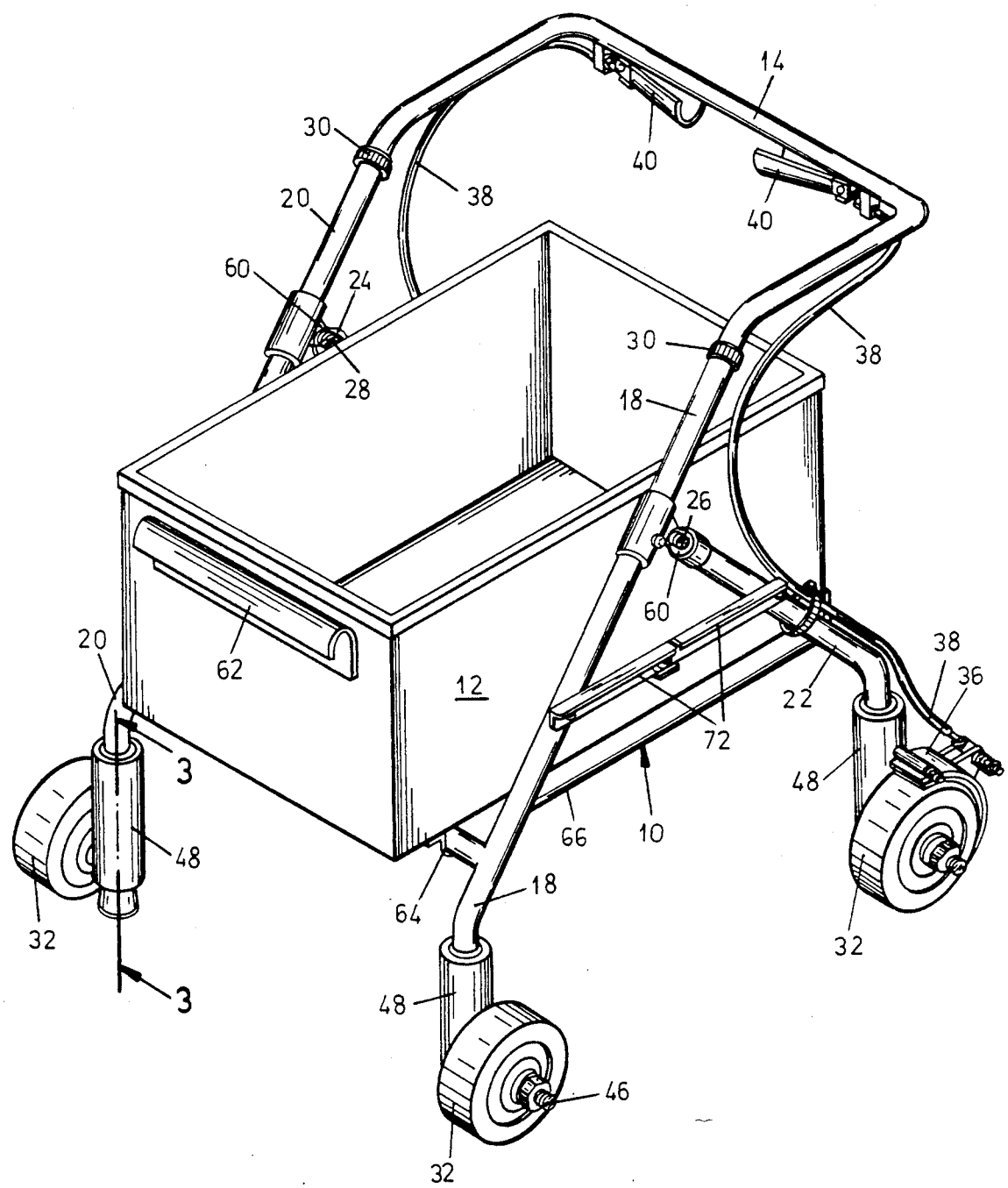
FIG. 1 is a perspective view of a collapsible walker that is a preferred embodiment of the invention.

FIGS. 1 and 2 show a collapsible walker 10 that is a preferred embodiment of the invention. Walker 10 is foldable in accordance with known principles to a size whereby it is easily stored in a car trunk or a closet.

Walker 10 may be considered to be for general use, but it is particularly intended for use by an elderly or a handicapped person, or any one of unsteady or teetery gait. Walker 10 in appearance resembles a shopping cart more than a walker and therefore might appeal to those who might be embarrassed to be seen with a walker.

Walker 10 comprises a basket 12 for carrying items, such as grocery bags, and a handle 14 for use in pushing (not pulling) walker 10 along an upwardly facing surface 16. Walker 10 further includes four tubular legs, namely, a left front leg 18, a right front leg 20, a left rear leg 22, and a right rear leg 24. Legs 22 and 24 have upper ends that are pivotally joined to legs 18 and 20 at 26 and 28, respectively. Legs 18, 20, 22 and 24 support basket 12.

Handle 14 has ends that are joined to the upper ends of legs 18 and 20 by knurled nuts 30 that can be turned to adjust the length and hence the height of handle 14.

Each of legs 18, 20, 22 and 24 has a lower end on which a wheel 32 is mounted. Each wheel 32 has a diameter of 6 inches (15.2 cm). The arrangement mounting each wheel 32 is a special one, providing mechanism whereby if a predetermined weight is applied to handle 14 or basket 12, as might happen if the user of walker 10 should fall while pushing walker 10 along surface 16, frictional braking elements 34 will be caused to enter into frictional engagement with surface 16, thereby stopping walker 10 and preventing a runaway, with attendant danger to the user, who may be unable to help himself or herself.

Before the special arrangement is described, it is mentioned that walker 10 is also provided with a standard manually operable braking system with a brake shoe 36 associated with each rear wheel 32 (only one of which is visible) and a cable 38. Each cable 38 is connected to a brake lever 40 conveniently mounted on handle 14, whereby braking can be effected manually as desired.

Figure 5:
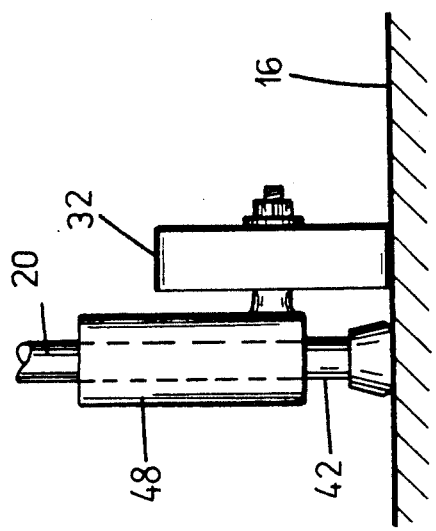
FIG. 5 is a view similar to FIG. 4 but showing the automatic braking mechanism actuated.
Figure 4:
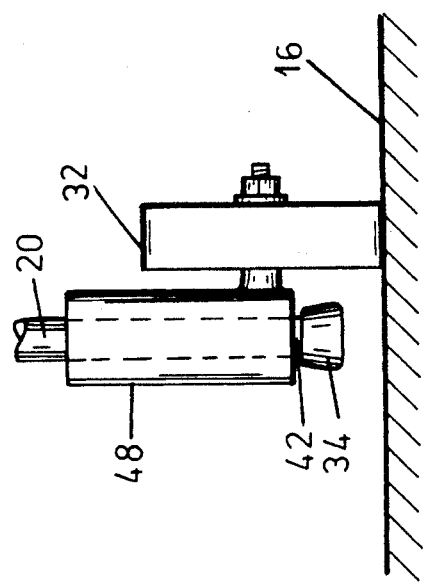
FIG. 4 is a view on line 4-4 of FIG. 3 showing the automatic braking mechanism unactuated.
Figure 3:
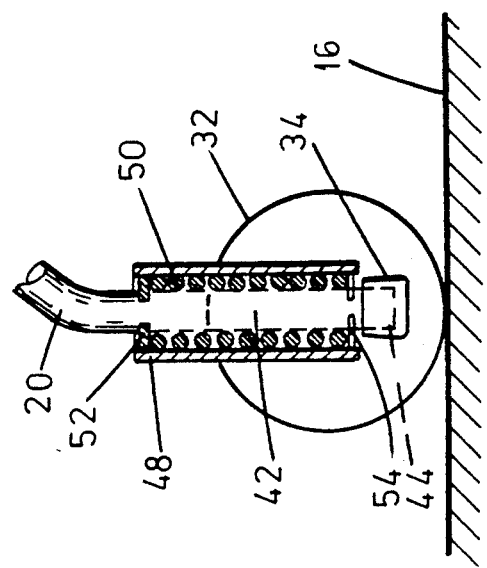
FIG. 3 is a fragmentary sectional view taken substantially on line 3—3 of FIG. 1.

The special arrangement provides means for automatically actuating braking elements 34 if a predetermined weight is applied to handle 14 or basket 12 will now be described. FIG. 3 shows right front leg 20. Each leg has its own special arrangement and the special arrangement is the same for all legs 18, 20, 22 and 24. Leg 20 has a straight lower end portion 42 that is substantially perpendicular to surface 16 when wheels 32 are on surface 16. Lower portion 42 terminates at a lower end 44 of leg 20, and lower end 44 has braking element 34 thereover in frictional engagement with the exterior of lower portion 42. Each braking element 34 may be a well known rubber cup. In any case, elements 34 may be of resilient material that may be described as rubberlike. The special arrangement also includes a sleeve 48 concentrically surrounding lower end portion 42 and of larger inside diameter than the outside diameter of lower leg portion 42, thus to create an annular space between lower end portion 42 and sleeve 48. A coil spring 50 (FIG. 3) is within the annular space, the upper end of which is defined by a washer 52 (FIG. 3) that is fixed with respect to lower end portion 42 and the upper end of spring 50 but frictionally engages the inner wall of sleeve 48. The lower end of the annular space is defined by a washer 54 (FIG. 3) that engages the lower end of spring 50. Spring 50 is under axial compression between washers 52 and 54, but the coils of spring 50 are separated, so that further axial compression is possible. As best seen in FIGS. 4 and 5, wheel 32 is rigidly affixed to the exterior of sleeve 48 near the lower end thereof, with its axis of rotation perpendicular to the axis of sleeve 48, and with its rim below the lower end of sleeve 48.

Coil springs 50 will support legs 18, 20, 22 and 24 with their respective braking elements 34 elevated above surface 16 until and unless a predetermined weight is applied to handle 14 or basket 12, in which even legs 18, 20, 22 and 24 and washers 52 will be driven downwardly with respect to sleeves 48, until braking elements 34 engage surface 16, as shown in FIG. 5, thus preventing further movement of walker 10 along surface 16. At the same time, springs 50 will be further compressed, increasing their upward bias against washers 52. When the weight is removed from handle 14 or basket 12, springs 50 will cause elements 34 to rise, out of engagement with surface 16.

Elements such as pivot connections 60, flanges 62 and 64, guide 66, rods 68 and 70 and hinged connection 72 have to do with the foldability of walker 10 and need not be described in detail.

It is apparent that the invention achieves the objects and advantages stated above, among others.

The disclosed details are exemplary only and are not to be taken as limitations on the invention except as those details are included in the appended claims.

What is claimed is:

1. A walker comprising a basket, a handle for use in pushing said walker along an upwardly facing surface, a plurality of legs connected to said basket and to said handle, each said leg having a lower end portion leading into a lower end, a wheel and a braking element associated with each said lower end, and means for automatically actuating said braking elements by causing same to engage the upwardly facing surface if a predetermined weight is applied to said handle or to said basket thus to stop said walker, wherein said means for automatically actuating each said braking element include a sleeve with an upper end and a lower end and surrounding said lower end portion with an annular space between said lower end portion and said sleeve, and a coil spring within said annular space and having an upper end that is fixed with respect to said lower end portion of its associated said leg, said spring also having a lower end that is fixed with respect to its associated said sleeve, and wherein said wheel is affixed to said sleeve near its said lower end with the axis of rotation of said wheel perpendicular to the axis of said sleeve and said wheel having a rim located below said lower end of said sleeve.

2. A walker according to claim 1 wherein each said braking element is a cup of rubberlike material engaging said lower end of one of said plurality of legs.

3. A walker according to claim 1 wherein said legs are four in number and include a left front leg, a right front leg, a left rear leg and a right rear leg.

4. A walker according to claim 1 further comprising a manually operable braking system.

* * * * *